(12) United States Patent
Okayama

(10) Patent No.: US 9,625,076 B2
(45) Date of Patent: Apr. 18, 2017

(54) LNG RECEIVING STRUCTURE

(75) Inventor: Kenji Okayama, Ichikawa (JP)

(73) Assignee: IHI CORPORATION (JP)

( * ) Notice: Subject to any disclaimer, the term of this patent is extended or adjusted under 35 U.S.C. 154(b) by 661 days.

(21) Appl. No.: 13/988,150

(22) PCT Filed: Nov. 18, 2011

(86) PCT No.: PCT/JP2011/076673
§ 371 (c)(1),
(2), (4) Date: May 17, 2013

(87) PCT Pub. No.: WO2012/070492
PCT Pub. Date: May 31, 2012

(65) Prior Publication Data
US 2013/0233427 A1    Sep. 12, 2013

(30) Foreign Application Priority Data
Nov. 22, 2010   (JP) ................................ 2010-260497

(51) Int. Cl.
    *F17C 13/00*    (2006.01)
    *F16L 55/027*   (2006.01)
    (Continued)

(52) U.S. Cl.
    CPC ............ *F16L 55/027* (2013.01); *B65D 88/28* (2013.01); *B65D 88/54* (2013.01); *F17C 6/00* (2013.01);
    (Continued)

(58) Field of Classification Search
    CPC ............. F17C 13/00; F17C 2223/0161; F17C 2260/042; F17C 2270/0136;
    (Continued)

(56) References Cited

U.S. PATENT DOCUMENTS

| 985,312   | A | * | 2/1911  | Woods  | B67C 11/04 141/298 |
| 1,325,991 | A | * | 12/1919 | King   | B67D 7/54 141/236  |
| 2,645,907 | A | * | 7/1953  | Droste | F17C 5/00 141/236  |

FOREIGN PATENT DOCUMENTS

| JP | 58-059130  | 4/1983 |
| JP | 63-135698  | 6/1988 |

(Continued)

OTHER PUBLICATIONS

International Search Report and Written Opinion mailed Feb. 21, 2012 in corresponding PCT International Application No. PCT/JP2011/076673.

*Primary Examiner* — Timothy L Maust
*Assistant Examiner* — Andrew Stclair
(74) *Attorney, Agent, or Firm* — Ostrolenk Faber LLP

(57) ABSTRACT

An LNG receiving structure (101) is provided with: a leader pipe (1) that is located below a receiving pipe (102) that penetrates a roof of an LNG tank, and extends as far as a bottom portion of the LNG tank; a hopper (2) that is provided at a top end of the leader pipe, and receives LNG expelled from the receiving pipe; a regulating component (3) that is provided inside the hopper, and regulates the flow of the LNG expelled from the receiving pipe such that this LNG flows down along an inside wall of the leader pipe; and a gas discharge port (4) that is provided in the hopper, and discharges to an outside of the hopper gas that has risen upwards from the leader pipe. By providing this LNG receiving structure, when a plurality of types of LNG that each have a different density are stored in the same LNG tank, it is possible to keep to a minimum any risk that rollover might occur.

6 Claims, 4 Drawing Sheets

(51) Int. Cl.
*B65D 88/28* (2006.01)
*F17C 6/00* (2006.01)
*B65D 88/54* (2006.01)

(52) U.S. Cl.
CPC .... *F17C 13/004* (2013.01); *F17C 2205/0352* (2013.01); *F17C 2221/033* (2013.01); *F17C 2223/0161* (2013.01); *F17C 2223/033* (2013.01); *F17C 2223/041* (2013.01); *F17C 2260/042* (2013.01); *F17C 2270/0123* (2013.01); *F17C 2270/0136* (2013.01)

(58) Field of Classification Search
CPC ........... F17C 2205/0352; F17C 13/004; B65D 88/28; F16L 55/027
USPC ..................................... 141/290, 298, 43, 55
See application file for complete search history.

(56) References Cited

FOREIGN PATENT DOCUMENTS

| | | |
|---|---|---|
| JP | 07-101489 | 4/1995 |
| JP | 09-119600 | 5/1997 |
| JP | 09-196297 | 7/1997 |
| JP | 09-210297 | 8/1997 |
| JP | 09-217896 | 8/1997 |
| JP | 10-061894 | 3/1998 |
| JP | 10-086995 | 4/1998 |
| JP | Y-2573664 | 6/1998 |
| JP | 11-037392 | 2/1999 |
| JP | 2000-281178 | 10/2000 |
| JP | 2006-095421 | 4/2006 |

\* cited by examiner

LNG RECEIVING STRUCTURE

CROSS-REFERENCE TO RELATED APPLICATIONS

The present application is a 35 U.S.C. §§371 national phase conversion of PCT/JP2011/076673, filed Nov. 18, 2011, which claims priority to Japanese Patent Application No. 2010-260497, filed Nov. 22, 2010, the contents of which are incorporated herein by reference. The PCT International Application was published in the Japanese language.

TECHNICAL FIELD

The present invention relates to an LNG (Liquefied Natural Gas) receiving structure.

BACKGROUND ART

The composition, density (i.e., the weight) and the like of LNG differs depending on the location of its production. In recent years, as the demand for LNG has increased, the development of different-density LNG storage technology for storing a plurality of types of LNG that each have a different density in the same LNG tank has been promoted. This different-density LNG storage technology has the considerable economic merits that it facilitates the handling and distribution of LNG, and it enables costs to be reduced. On the other hand, when a mixture of LNG of different densities is being stored, it is necessary to formulate measures to counter rollover which occurs as a result of stratification inside the LNG tank.

'Stratification' refers to the formation of a plurality of liquid layers of mutually different densities that occurs if a plurality of types of LNG that each have a different density are introduced into an LNG tank when LNG having a high density (i.e., heavy LNG) collects on the bottom of the LNG tank and LNG having a low density (i.e., light LNG) accumulates in the top thereof. 'Rollover' refers to a phenomenon in which, when the difference in densities between vertically adjacent layers within an LNG tank that has become stratified in the manner described above decreases due to the introduction of heat from the outside so that the boundary between these layers disappears, the heat energy that had accumulated up to that point in the lower layer is released in a short space of time from the liquid surface in the form of the generation of an immense quantity of BOG (Boil Off Gas).

If the quantity of BOG that is generated by this rollover exceeds the processing capability of the BOG compressor, then in order to control the rise in the pressure inside the tank, it is necessary to operate a safety valve so as to discharge the excess BOG to the outside of the tank. However, if the quantity of BOG that is generated exceeds even the excess BOG discharge capability of the safety valve, then it is no longer possible to control the rise in pressure inside the tank, and there is a possibility that the tank itself may rupture. Accordingly, in order to avoid the occurrence of rollover, it is necessary to suppress stratification inside the LNG tank as much as possible.

Conventionally, two receiving pipes are provided that penetrate the roof of an LNG tank, and a leader pipe that extends as far as the bottom portion of the LNG tank is provided under one of the receiving pipes so that heavy LNG is received from the top portion of the tank through the receiving pipe. In contrast, light LNG is received from the bottom portion of the tank through the receiving pipe and the leader pipe. As a result, the mixing together of different-density LNG is promoted and stratification is suppressed.

Note that an LNG receiving structure of a conventional LNG tank is described in Patent documents 1 and 2 (see below).

CITATION LIST

Patent Documents

Patent document 1: Japanese Unexamined Patent Application, First Publication No. S63-135698
Patent document 2: Japanese Unexamined Patent Application, First Publication No. 2000-281178

SUMMARY OF INVENTION

Technical Problem

A hopper that receives the LNG expelled from the bottom end of the receiving pipe is provided at the top end of the leader pipe. When heavy LNG has accumulated inside the LNG tank, then if light LNG is introduced through the leader pipe, it becomes difficult for the light LNG to be expelled from the bottom end of the leader pipe due to the density difference between the two LNG types, and there is a possibility that the light LNG will overflow from the hopper.

If light LNG overflows from the hopper, then because the light LNG accumulates on top of the heavy LNG that has already accumulated there, there is a possibility that stratification will occur and that this stratification may generate rollover. Namely, in a conventional LNG receiving structure, there is still a possibility that rollover will occur, and it is necessary for a solution to this problem to be formulated.

The present invention was conceived in view of the above-described circumstances, and it is an object thereof to keep to a minimum any risk that rollover might occur when a plurality of types of LNG that each have a different density are stored in the same LNG tank.

Solution to Problem

In order to solve the above-described problems, an LNG receiving structure according to a first aspect of the present invention includes: a leader pipe that is located below a receiving pipe that penetrates a roof of an LNG tank, and extends as far as a bottom portion of the LNG tank; a hopper that is provided at a top end of the leader pipe, and receives LNG expelled from the receiving pipe; a regulating component that is provided inside the hopper, and regulates the flow of the LNG expelled from the receiving pipe such that the LNG flows down along an inside wall of the leader pipe; and a gas discharge port that is provided in the hopper, and discharges to an outside of the hopper gas that has risen upwards from the leader pipe.

In the LNG receiving structure according to a second aspect of the present invention, in the above-described first aspect, the regulating component is a V-plate formed in a V-shape, and the V-plate is positioned such that an apex portion of the V-plate faces an expulsion portion of the receiving pipe, and such that a space on an inner side of the V-plate communicates with the gas discharge port.

In the LNG receiving structure according to a third aspect of the present invention, in the above-described second aspect, an apex angle of the V-plate is set to an angle that enables respective line extensions of a pair of inclined portions of the V-plate to come into contact with the leader pipe.

In this case, the apex angle of the V-plate may be set to an angle that causes a top end of the leader pipe to be positioned on the respective line extensions of the pair of inclined portions of the V-plate.

In the LNG receiving structure according to a fourth aspect of the present invention, in any one of the above-described first through third aspects, there is further provided a partitioning component that partitions an internal space inside the leader pipe into an LNG flow path and a gas flow path.

In the LNG receiving structure according to a fifth aspect of the present invention, in the above-described fourth aspect, the partitioning component is a tubular component that forms a space between an outside wall of the partitioning component and the inside wall of the leader pipe as the LNG flow path, and forms an internal space of the partitioning component as the gas flow path.

In the LNG receiving structure according to a sixth aspect of the present invention, in any one of the above-described first through fifth aspects, there is further provided an exhaust pipe that communicates with the gas discharge port, and extends upwards.

Advantageous Effects of Invention

According to the LNG receiving structure of the present invention, even if light LNG is introduced through a leader pipe when heavy LNG has already accumulated inside an LNG tank, it is difficult for the light LNG to overflow from the hopper. Namely, because it is difficult for stratification, which causes rollover to occur, to be generated, the risk that rollover will occur inside the LNG tank can be minimized as much as possible.

DESCRIPTION OF EMBODIMENTS

Hereinafter, an embodiment of the present invention will be described with reference made to the drawings.

Figure 1A:
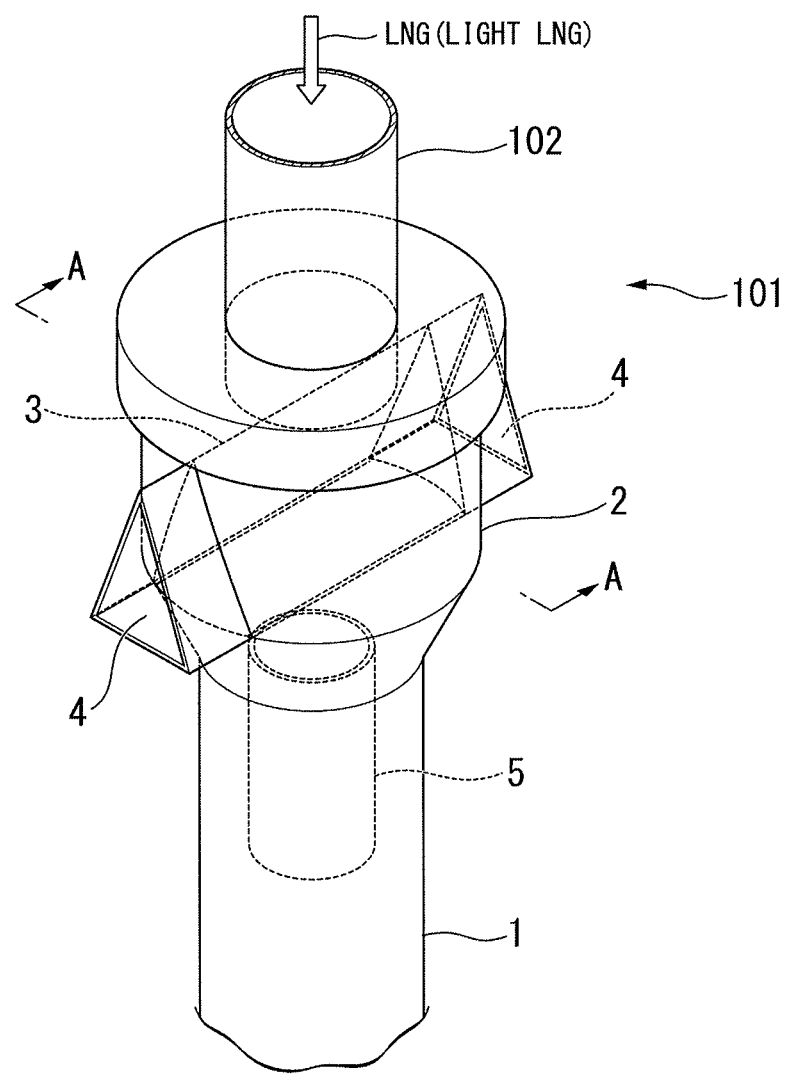
FIG. 1A is a perspective view showing an LNG receiving structure according to an embodiment.
Figure 1B:
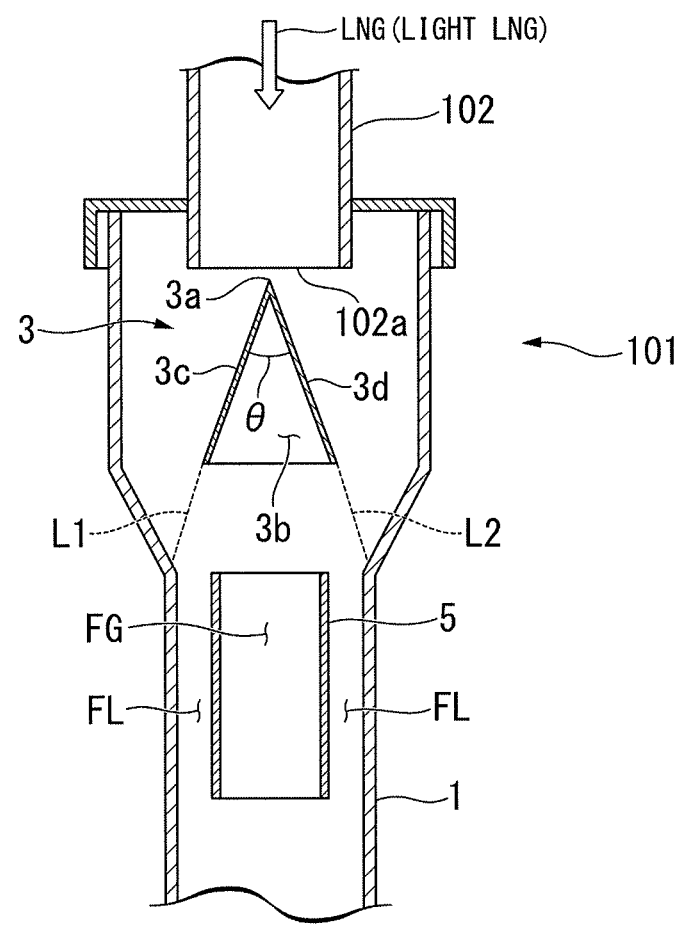
FIG. 1B is a cross-sectional view taken along a line A-A in FIG. 1A of the LNG receiving structure according to the embodiment.

FIG. 1A is a perspective view of an LNG receiving structure 101 of the present embodiment. FIG. 1B is a cross-sectional view taken along a line A-A of the LNG receiving structure 101.

In these drawings, the symbol 1 is a leader pipe that is located below a receiving pipe 102 that penetrates the roof of the LNG tank and extends as far as the bottom portion of the LNG tank. The symbol 2 is a hopper that is provided at a top end of the leader pipe 1 and receives LNG expelled from the receiving pipe 102. The symbol 3 is a regulating component that is provided inside the hopper 2 and regulates the flow of the LNG expelled from the receiving pipe 102 such that this LNG flows down along an inside wall of the leader pipe 1. The symbol 4 is a gas discharge port that is provided in the hopper 2 and discharges gas that has risen upwards from the leader pipe 1 to the outside of the hopper 2. The symbol 5 is a partitioning component that is provided inside the leader pipe 1 and partitions the internal space of the leader pipe 1 into an LNG flow path FL and a gas flow path FG.

The regulating component 3 is a V-plate that is formed in a V-shape. This V-plate 3 is positioned such that an apex portion 3a of the V-plate 3 faces an expulsion portion 102a of the receiving pipe 102, and such that a space 3b on the inner side of the V-plate 3 (i.e., a space sandwiched by a pair of inclined portions 3c and 3d) communicates with the gas discharge port 4. Moreover, an apex angle θ of the V-plate 3 is set to an angle that causes the top end of the leader pipe 1 to be positioned on line extensions L1 and L2 of the pair of inclined portions 3c and 3d of the V-plate 3.

The partitioning component 5 is a tubular component that forms a space between its own outside wall and the inside wall of the leader pipe 1 as the LNG flow path FL, and forms its own internal space as the gas flow path FG. Note that in FIG. 1, a state is shown in which a single partitioning component 5 is provided in a portion where the leader pipe 1 joins to the hopper 2, however, it is also possible for a plurality of partitioning components 5 to be placed at uniform intervals along the lengthwise direction of the leader pipe 1.

Next, the operation and effects of the LNG receiving structure 101 that is constructed in the manner described above will be described.

Figure 2:
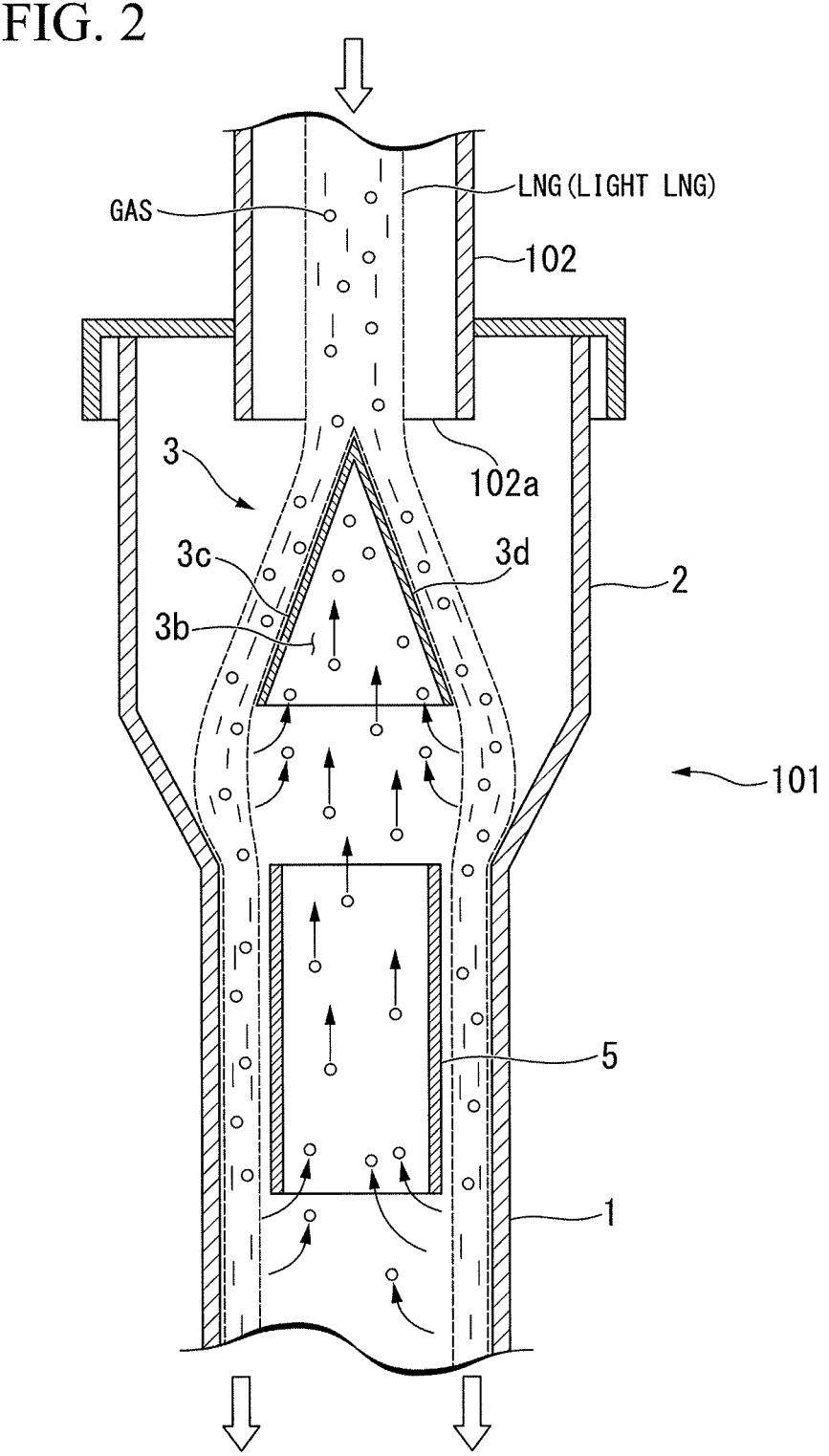
FIG. 2 is a view illustrating the operation and effects of the LNG receiving structure according to the embodiment.

Light LNG that has been unloaded from an LNG tanker is transferred to the LNG tank through the receiving pipe 102. This light LNG is gas-liquid fluid mixture that contains flash gas (hereinafter, referred to simply as 'gas'). As is shown in FIG. 2, the light LNG discharged into the hopper 2 from the expulsion portion 102a of the receiving pipe 102 is split into light LNG that flows along the one inclined portion 3c of the V-plate 3, and light LNG that flows along the other inclined portion 3d of the V-plate 3.

After both flows of the light LNG that have been split by the V-plate 3 have flowed down and collided with the bottom end portion of the hopper 2, they flow down along the inside wall of the leader pipe 1. At this time, by causing the light LNG to flow along the LNG flow path FL that has been partitioned by the partitioning component 5, a flow regulating action towards the LNG is achieved. As a result, the light LNG flows down in a long distance towards the bottom portion of the LNG tank along the inside wall of the leader pipe 1 without being turbulent.

In the process in which the light LNG flows downwards along the inside wall of the leader pipe 1 in this manner, the flow rate of the light LNG decelerates so that a gas-liquid separation is encouraged, and the gas separates from the light LNG. The separated gas rises inside the leader pipe 1 and arrives at the space 3b on the inside of the V-plate 3 via the gas flow path FG in the partitioning component 5. The gas that has risen as far as the space 3b on the inside of the V-plate 3 is then discharged to the outside of the hopper 2 from the gas discharge port 4 that communicates with the space 3b.

As is described above, when a gas-liquid separation is encouraged through the process of the light LNG flowing down the inside wall of the leader pipe 1, the further the distance of this downward flow, the greater the density of the light LNG becomes. Namely, if the light LNG is introduced through the leader pipe 1 when the heavy LNG has already accumulated inside the LNG tank, then the difference between the densities of the two types of LNG can be reduced. Consequently, the light LNG is able to be expelled more easily from the bottom end of the leader pipe 1, and it becomes more difficult for the light LNG to overflow from the hopper 2. Accordingly, according to the present embodiment, it becomes difficult for stratification, which causes rollover to occur, to be generated, and it is possible to keep to a minimum any risk that rollover might occur.

Figure 3:
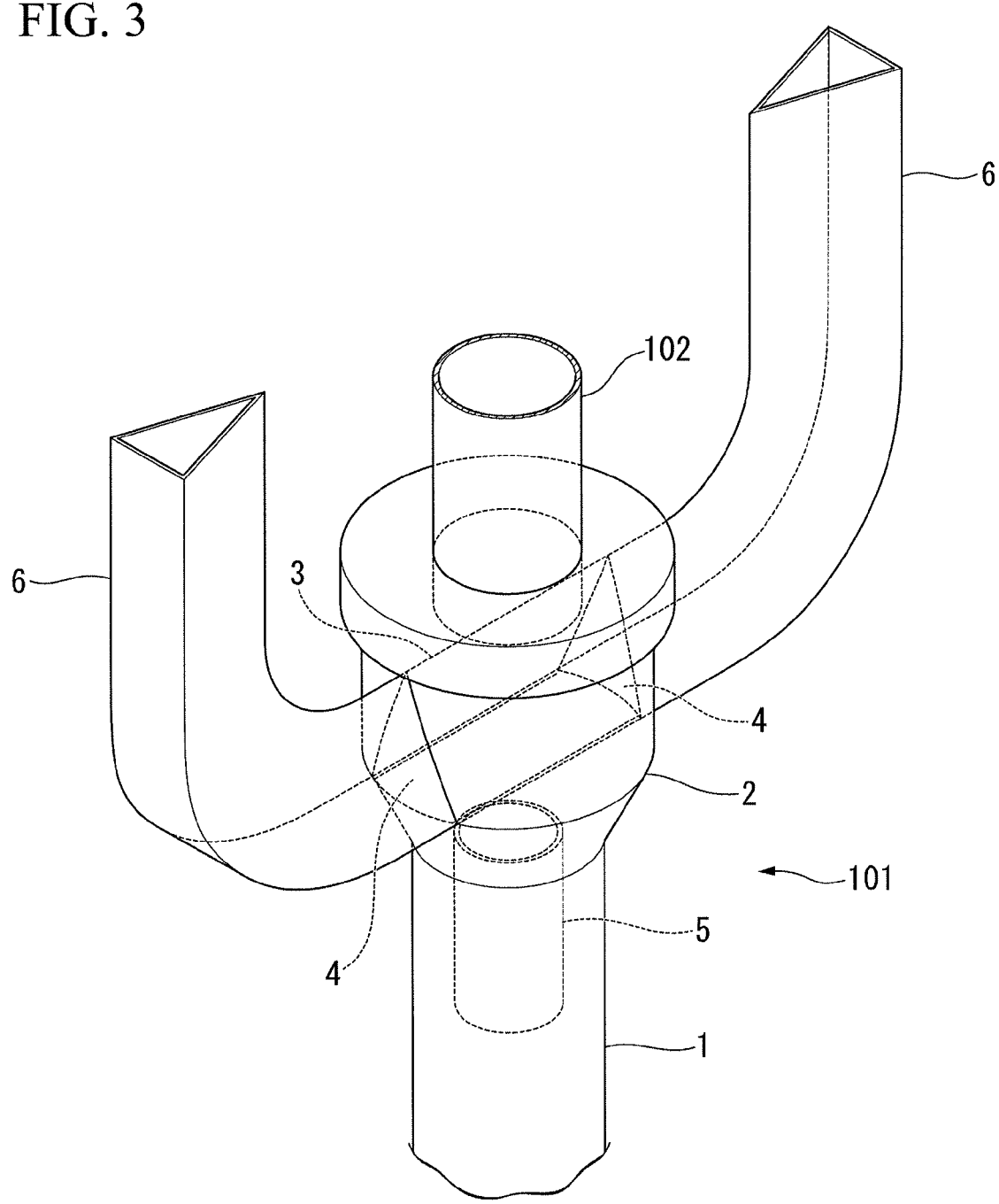
FIG. 3 is a variant example of an LNG receiving structure according to the present invention.

Note that the present invention is not limited to the above-described embodiment, and the following variant examples of the present invention may be also be proffered.
(1) In the above-described embodiment, a case is illustrated in which the V-plate 3, which is formed in a V-shape, is used as a regulating component, however, the shape of the regulating component is not particularly restricted provided that it is able to regulate the flow of the LNG such that the LNG expelled from the receiving tube 2 flows downwards along the inside wall of the leader pipe 1.
(2) In the above-described embodiment, the apex angle θ of the V-plate 3 is set to an angle that causes the top end of the leader pipe 1 to be positioned on the line extensions L1 and L2 of the pair of inclined portions 3c and 3d of the V-plate 3. However, it is sufficient for the apex angle θ of the V-plate 3 to be set to an angle that enables the aforementioned line extensions L1 and L2 to come into contact with the leader pipe 1. Here, this contact between the line extensions L1 and L2 and the leader pipe 1 includes not only cases in which the top end of the leader pipe 1 is positioned on the line extensions L1 and L2, but also cases in which the line extensions L1 and L2 intersect with the leader pipe 1.
(3) In the above-described embodiment, a case is illustrated in which the partitioning component 5 that partitions the internal space inside the leader pipe 1 into the LNG flow path FL and the gas flow path FG is provided inside the leader pipe 1, however, it is not absolutely essential for this partitioning component 5 to be provided.
(4) In the structure shown in FIG. 1, when the liquid surface inside the LNG tank reaches as far as the gas discharge port 4, there is a possibility that liquid will intrude into the inside of the hopper 2 from the gas discharge port 4, and will obstruct the discharging of the gas and the introduction of the light LNG. In order to prevent this, as is shown in FIG. 3, it is also possible to employ a structure in which an exhaust pipe 6 that communicates with the gas discharge port 4 and extends upwards is connected to the hopper 2.

INDUSTRIAL APPLICABILITY

According to the present invention, when a plurality of types of LNG that each have a different density are stored in the same LNG tank, it is possible to keep to a minimum any risk that rollover might occur.

REFERENCE SIGNS LIST

1: Leader pipe
2: Hopper
3: V-Plate (Regulating component)
4: Gas discharge port
5: Partitioning component
6: Exhaust pipe
101: LNG receiving structure
102: Receiving pipe

The invention claimed is:
1. An LNG receiving structure comprising:
a receiving pipe that penetrates a roof of an LNG tank;
a leader pipe that is located below the receiving pipe and extends as far as a bottom portion of the LNG tank;
a hopper that is provided at a top end of the leader pipe, and is positioned and configured to receive LNG expelled from the receiving pipe;
a regulating component that is provided inside the hopper, and is positioned and configured to regulate the flow of the LNG expelled from the receiving pipe such that the LNG flows down along an inside wall of the leader pipe;
a gas discharge port that is provided in the hopper, and is positioned and configured to discharge to an outside of the hopper gas that has risen upwards from the leader pipe, and
a partitioning component that is positioned and configured to partition an internal space inside the leader pipe into an LNG flow path and a gas flow path,
wherein the partitioning component is a tubular component that forms a space between an outside wall of the partitioning component and the inside wall of the leader pipe as the LNG flow path, and forms an internal space of the partitioning component as the gas flow path, and
wherein a top end of the partitioning component opens so as to face a bottom end of the regulating component, and a top end surface of the partitioning component constitutes a horizontal plane at a position that coincides with the top end of the leader pipe.
2. The LNG receiving structure according to claim 1, wherein
the regulating component is a V-plate formed in a V-shape, and
the V-plate is positioned such that an apex portion of the V-plate faces an expulsion portion of the receiving pipe, and such that a space on an inner side of the V-plate communicates with the gas discharge port.
3. The LNG receiving structure according to claim 2, wherein an apex angle of the V-plate is set to an angle that enables respective line extensions of a pair of inclined portions of the V-plate to come into contact with the leader pipe.
4. The LNG receiving structure according to claim 3, wherein the apex angle of the V-plate is set to an angle that causes the top end of the leader pipe to be positioned on the respective line extensions of the pair of inclined portions of the V-plate.
5. The LNG receiving structure according to claim 1, further comprising an exhaust pipe that communicates with the gas discharge port, and extends upwards.
6. The LNG receiving structure according to claim 1, wherein
the regulating component is a V-plate formed in a V-shape, and
the V-plate is positioned such that an apex portion of the V-plate faces an expulsion portion of the receiving pipe, and such that a space on an inner side of the V-plate communicates with the gas discharge port, and
wherein an apex angle of the V-plate is set to an angle that causes the top end of the leader pipe to be positioned on respective line extensions of a pair of inclined portions of the V-plate.

* * * * *